United States Patent
Cao et al.

(10) Patent No.: US 11,080,909 B2
(45) Date of Patent: Aug. 3, 2021

(54) IMAGE LAYER PROCESSING METHOD AND COMPUTING DEVICE

(71) Applicant: Huawei Technologies Co., Ltd., Shenzhen (CN)

(72) Inventors: Jinhui Cao, Shenzhen (CN); Zhe Wang, Xi'an (CN); Jincheng Li, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 176 days.

(21) Appl. No.: 16/030,442

(22) Filed: Jul. 9, 2018

(65) Prior Publication Data

US 2018/0322675 A1 Nov. 8, 2018

Related U.S. Application Data

(63) Continuation of application No. PCT/CN2016/109686, filed on Dec. 13, 2016.

(51) Int. Cl.
*G06T 11/60* (2006.01)
*G06F 16/51* (2019.01)

(52) U.S. Cl.
CPC .............. *G06T 11/60* (2013.01); *G06F 16/51* (2019.01); *G06T 2200/24* (2013.01)

(58) Field of Classification Search
CPC .... G06T 11/60; H04N 5/272; G09G 2340/10; G09G 2340/12
See application file for complete search history.

(56) References Cited

U.S. PATENT DOCUMENTS

| 10,061,520 | B1* | 8/2018 | Zhao ................... G06F 3/0673 |
| 2012/0109895 | A1 | 5/2012 | Zwilling et al. |
| 2014/0297721 | A1 | 10/2014 | Wang |
| 2015/0084986 | A1* | 3/2015 | Lee .................... G09G 5/026 345/629 |

FOREIGN PATENT DOCUMENTS

| CN | 102081580 A | 6/2011 |
| CN | 102185928 A | 9/2011 |
| CN | 102193807 A | 9/2011 |
| CN | 102708060 A | 10/2012 |
| CN | 10316108 A | 6/2013 |

(Continued)

OTHER PUBLICATIONS

Machine Translation and Abstract of Chinese Publication No. CN102193807, Sep. 21, 2011, 17 pages.

(Continued)

*Primary Examiner* — Kenny A Cese
(74) *Attorney, Agent, or Firm* — Conley Rose, P.C.

(57) ABSTRACT

An image processing method to reduce access pressure of each image in an image set, where the image processing method includes obtaining a quantity of times each image layer in an image set is accessed, determining one or more first image layers, where a quantity of times the first image layer in the image set is accessed is greater than a first threshold, and the first image layer has at least two child image layers, generating a copy of the first image layer, and modifying some child image layers of the first image layer to child image layers of the copy of the first image layer.

18 Claims, 7 Drawing Sheets

(56) References Cited

FOREIGN PATENT DOCUMENTS

| CN | 105094924 A | 11/2015 |
| CN | 105516223 A | 4/2016 |
| CN | 106202429 A | 12/2016 |

OTHER PUBLICATIONS

Machine Translation and Abstract of Chinese Publication No. CN105094924, Nov. 25, 2015, 27 pages.
Machine Translation and Abstract of Chinese Publication No. CN106202429, Dec. 7, 2016, 14 pages.
Foreign Communication From a Counterpart Application, PCT Application No. PCT/CN2016/109686, International Search Report dated Sep. 12, 2017, 8 pages.
Foreign Communication From a Counterpart Application, PCT Application No. PCT/CN2016/109686, Written Opinion dated Sep. 12, 2017, 4 pages.
Liu Minghui, "Virtual Image Management Research and Implementation in Cloud Computing," University of Electronic Science and Technology, 2016, with an English abstract, with partial translation, 110 pages.

* cited by examiner

IMAGE LAYER PROCESSING METHOD AND COMPUTING DEVICE

CROSS-REFERENCE TO RELATED APPLICATIONS

This application is a continuation of International Patent Application No. PCT/CN2016/109686 filed on Dec. 13, 2016, which is hereby incorporated by reference in its entirety.

TECHNICAL FIELD

The present disclosure relates to the field of computer technologies, and in particular, to an image processing method and a computing device applicable to the image processing method.

BACKGROUND

A container technology is a lightweight virtual technology that is based on an operating system. A container runs in user space above an operating system, and containers on a host share an operating system kernel. One core of the container technology is use of an image.

The image used in the container technology includes image layers. Each image layer includes various modifications made based on a parent image layer of the image layer. Therefore, a complete image includes all image layers required by the image. A user may make and publish an image, or download a required image from an image hub. After downloading an image to a host, the user may start a container corresponding to the image according to the downloaded image.

When accessing an image, the user needs to access all image layers included in the image to obtain complete image data. When an image layer includes an extremely large quantity of child image layers, access pressure of the image layer is extremely large, and entire image performance is affected.

SUMMARY

This application provides an image processing method in order to reduce access pressure of each image in an image set. This application further provides a related computing device.

A first aspect of this application provides an image processing method that is applicable to a computing device on which an image set is deployed. The image set includes a base image and an image obtained by superimposing P image layers on the base image, where P is a positive integer. Each image layer has a parent image layer. The image processing method includes obtaining a quantity of times each image layer in the image set is accessed, determining a first image layer according to the quantity of times each image layer is accessed, where a quantity of times the first image layer is accessed is greater than a first threshold, generating a copy of the first image layer, and modifying a child image layer of the first image layer to a child image layer of the copy of the first image layer, where the modified child image layer may be some child image layers of the first image layer.

In this method, a parent image layer of the modified child image layer changes from the first image layer to the copy of the first image layer. When accessing the modified child image layer again, a user accesses the copy of the first image layer instead of the first image layer. In this way, some access traffic at the first image layer is offloaded to the copy of the first image layer, and access pressure of the first image layer is reduced.

Optionally, each image layer in the image set has an image layer identity (ID), and each image layer further records a parent image layer ID. The computing device generates the copy of the first image layer in the manner of copying the first image layer to obtain the copy of the first image layer, and configuring an image layer ID for the copy of the first image layer. The computing device modifies the child image layer of the first image layer to the child image layer of the copy of the first image layer in the manner of modifying a parent image layer ID of the child image layer of the first image layer to the image layer ID of the copy of the first image layer.

Optionally, after obtaining the quantity of times each image layer is accessed, the computing device further determines a second image layer according to the quantity of times each image layer is accessed, where a quantity of times the second image layer is accessed is less than a second threshold, and the image set further includes a copy of the second image layer. After modifying a child image layer of the second image layer to a child image layer of the copy of the second image layer, the computing device deletes the second image layer. An image layer with small access pressure is deleted such that a quantity of image layers in the image set is reduced, a topology structure of the image set is simplified, and storage resources are saved.

A second aspect of this application provides an image processing method that is applicable to a computing device serving as a management node in a computing device cluster. The computing device cluster further includes a shared storage, each computing device in the computing device cluster can access an image set deployed on the shared storage, and the image set includes a base image and an image obtained by superimposing P image layers on the base image, where P is a positive integer. Each image layer has a parent image layer. The image processing method includes obtaining a quantity of times each image layer in the image set is accessed, determining a third image layer according to the quantity of times each image layer is accessed, where a quantity of times the third image layer is accessed is greater than a third threshold, generating a copy of the third image layer, and modifying a child image layer of the third image layer to a child image layer of the copy of the third image layer, where the modified child image layer may be some child image layers of the third image layer.

In this method, a parent image layer of the modified child image layer changes from the third image layer to the copy of the third image layer. When accessing the modified child image layer again, a user accesses the copy of the third image layer instead of the third image layer. In this way, some access traffic at the third image layer is offloaded to the copy of the third image layer, and access pressure of the third image layer is reduced.

Optionally, the computing device serving as a management node may obtain, in the following manner, the quantity of times each image layer is accessed. The manner includes obtaining access information sent by each computing device in the computing device cluster, where each piece of access information includes a quantity of times one computing device in the computing device cluster accesses each image layer in the image set, and collecting statistics on the access information sent by each computing device in the computing device cluster in order to obtain the quantity of times each image layer in the image set is accessed.

Optionally, each image layer in the image set has an image layer ID, and each image layer further records a parent image layer ID. The computing device generates the copy of the third image layer in the manner of copying the third image layer to obtain the copy of the third image layer, and configuring an image layer ID for the copy of the third image layer. The computing device modifies the child image layer of the third image layer to the child image layer of the copy of the third image layer in the manner of modifying a parent image layer ID of the child image layer of the third image layer to the image layer ID of the copy of the third image layer.

Optionally, after obtaining the quantity of times each image layer is accessed, the computing device further determines a fourth image layer according to the quantity of times each image layer is accessed, where a quantity of times the fourth image layer is accessed is less than a fourth threshold, and the image set further includes a copy of the fourth image layer. After modifying a child image layer of the fourth image layer to a child image layer of the copy of the fourth image layer, the computing device deletes the fourth image layer. An image layer with small access pressure is deleted such that a quantity of image layers in the image set is reduced, a topology structure of the image set is simplified, and storage resources are saved.

A third aspect of this application provides a computing device, and an image set is deployed on the computing device. The image set includes a base image and an image obtained by superimposing P image layers on the base image, where P is a positive integer. Each image layer has a parent image layer. The computing device includes a processor, a memory, and a communications interface, and by invoking program code in the memory, the processor is configured to obtain a quantity of times each image layer in the image set is accessed, determine a first image layer according to the quantity of times each image layer is accessed, where a quantity of times the first image layer is accessed is greater than a first threshold, generate a copy of the first image layer, and modify a child image layer of the first image layer to a child image layer of the copy of the first image layer, where the modified child image layer may be some child image layers of the first image layer.

A parent image layer of the modified child image layer changes from the first image layer to the copy of the first image layer such that when accessing the modified child image layer again, a user accesses the copy of the first image layer instead of the first image layer. In this way, some access traffic at the first image layer is offloaded to the copy of the first image layer, and access pressure of the first image layer is reduced.

Optionally, each image layer in the image set has an image layer ID, and each image layer further records a parent image layer ID. The processor is configured to generate the copy of the first image layer in the manner of copying the first image layer to obtain the copy of the first image layer, and configuring an image layer ID for the copy of the first image layer. The processor is further configured to modify the child image layer of the first image layer to the child image layer of the copy of the first image layer in the manner of modifying a parent image layer ID of the child image layer of the first image layer to the image layer ID of the copy of the first image layer.

Optionally, after obtaining the quantity of times each image layer is accessed, the processor is further configured to determine a second image layer according to the quantity of times each image layer is accessed, where a quantity of times the second image layer is accessed is less than a second threshold, and the image set further includes a copy of the second image layer, and delete the second image layer after modifying a child image layer of the second image layer to a child image layer of the copy of the second image layer. An image layer with small access pressure is deleted such that a quantity of image layers in the image set can be reduced, a topology structure of the image set is simplified, and storage resources are saved.

A fourth aspect of this application provides a computing device serving as a management node in a computing device cluster. The computing device cluster further includes a shared storage, each computing device in the computing device cluster can access an image set deployed on the shared storage, and the image set includes a base image and an image obtained by superimposing P image layers on the base image, where P is a positive integer. Each image layer has a parent image layer. The computing device includes a processor, a memory, and a communications interface, and by invoking program code in the memory, the processor is configured to obtain a quantity of times each image layer in the image set is accessed, determine a third image layer according to the quantity of times each image layer is accessed, where a quantity of times the third image layer is accessed is greater than a third threshold, generate a copy of the third image layer, and modify a child image layer of the third image layer to a child image layer of the copy of the third image layer, where the modified child image layer may be some child image layers of the third image layer.

A parent image layer of the modified child image layer changes from the third image layer to the copy of the third image layer such that when accessing the modified child image layer again, a user accesses the copy of the third image layer instead of the third image layer. In this way, some access traffic at the third image layer is offloaded to the copy of the third image layer, and access pressure of the third image layer is reduced.

Optionally, the processor is configured to obtain, in the following manner, the quantity of times each image layer is accessed. The manner includes obtaining access information sent by each computing device in the computing device cluster, where each piece of access information includes a quantity of times one computing device in the computing device cluster accesses each image layer in the image set, and collecting statistics on the access information sent by each computing device in the computing device cluster in order to obtain the quantity of times each image layer in the image set is accessed.

Optionally, each image layer in the image set has an image layer ID, and each image layer further records a parent image layer ID. The processor is configured to generate the copy of the third image layer in the manner of copying the third image layer to obtain the copy of the third image layer, and configuring an image layer ID for the copy of the third image layer. The processor is further configured to modify the child image layer of the third image layer to the child image layer of the copy of the third image layer in the manner of modifying a parent image layer ID of the child image layer of the third image layer to the image layer ID of the copy of the third image layer.

Optionally, after obtaining the quantity of times each image layer is accessed, the processor is further configured to determine a fourth image layer according to the quantity of times each image layer is accessed, where a quantity of times the fourth image layer is accessed is less than a fourth threshold, and the image set further includes a copy of the fourth image layer, and delete the fourth image layer after modifying a child image layer of the fourth image layer to a child image layer of the copy of the fourth image layer. The processor deletes an image layer with small access pressure such that a quantity of image layers in the image set can be reduced, a topology structure of the image set is simplified, and storage resources are saved.

A fifth aspect of this application provides a storage medium, the storage medium stores program code, and when executing the program code, a computing device performs the image processing method provided in the first aspect of this application. The storage medium includes but is not limited to a flash memory, a hard disk drive (HDD), or a solid state drive (SSD).

A sixth aspect of this application provides a computer program product, the computer program product includes an instruction, and when the computer program product is executed by a computer, the computer performs the image processing method provided in the first aspect. The computer program product may be a software installation package.

DESCRIPTION OF EMBODIMENTS

This application provides an image processing method in order to reduce access pressure of each image in an image set. This application further provides a related computing device, and description is separately provided in the following.

An image is a sequential set of modifications to a root filesystem and parameters used during running of a corresponding container, and is used to support running of the container. The image can provide a filesystem perspective for the container, but the image does not include an operating system kernel. A set of multiple images is referred to as an image set.

An image set includes a base image, and another image in the image set is obtained by superimposing one or more image layers on the base image. A user usually accesses the image set at a granularity of an image. The superimposed image layer includes incremental data for modifying the image. For example, P image layers are superimposed on the base image, and an image A can be obtained. The P image layers store incremental data of the image A relative to the base image. If the user is to access the image A, the user needs to successively read each image layer from the top image layer in the P image layers to the base image. In this way, access to the image A is completed.

Each image layer in the image set is identified by an image ID, and each image layer ID is globally unique. An image layer ID may include a 64-bit hexadecimal character string. In addition, the top image layer of each image further has an image tag for identifying a version of the image, for example, Mysql: 5.6.

An image is a read-only file, and the image is rewritten by superimposing image layers. For example, if the user is to rewrite the image A, the user superimposes Q image layers on the image A to obtain an image B. The image B may be considered as a new version of the image A. The Q image layers store incremental data of the image B relative to the image A. Because the image B is obtained based on the image A, the image B inherits functions of the image A, and using the Q image layers, a new function is added or functions of the image A are improved.

Image layers are associated using a parent-child relationship. In an example of the P image layers of the image A that are superimposed relative to the base image, there is a parent-child relationship between two adjacent image layers in the P image layers. In addition, from top to bottom, an $(N+1)^{th}$ image layer is a parent image layer of an $N^{th}$ image layer, and the $N^{th}$ image layer is a child image layer of the $(N+1)^{th}$ image layer, where $1 \leq N < P$. In addition, a parent image of a $P^{th}$ image layer is the base image.

Figure 1:
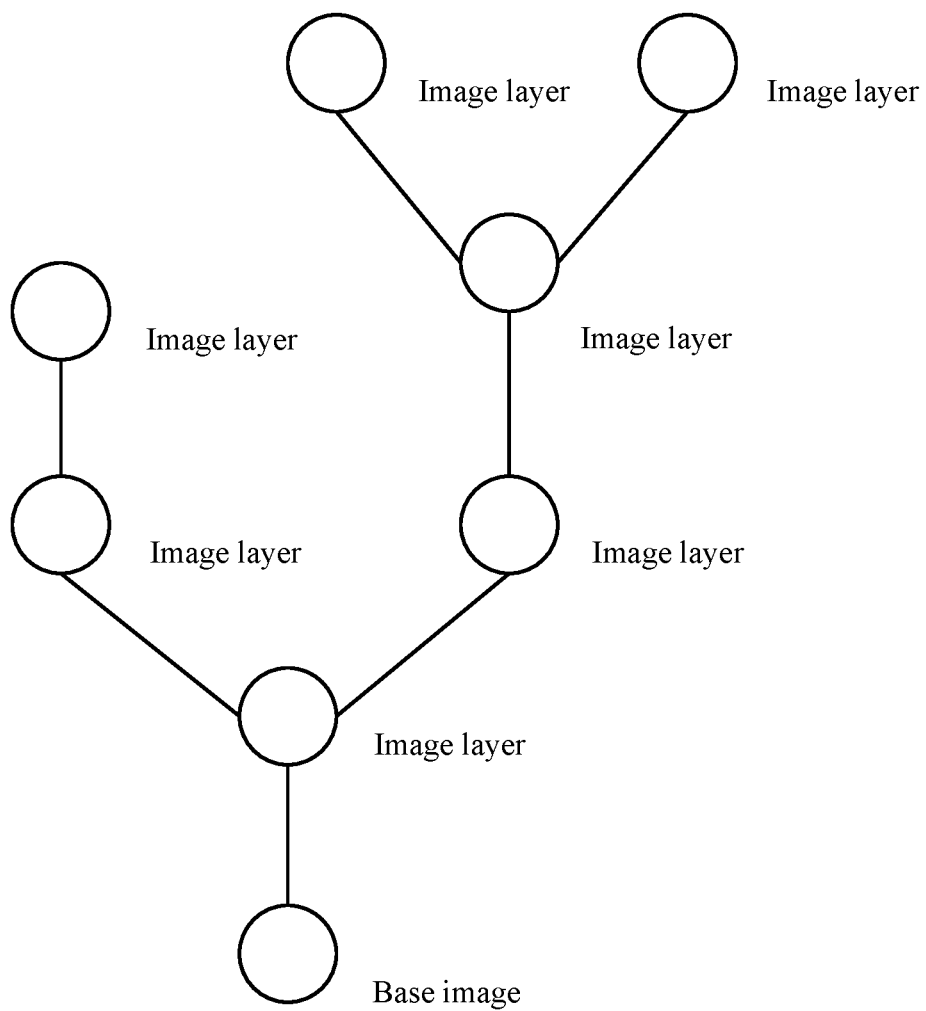
FIG. 1 is a schematic diagram of a topology structure of an image set.

Image layers in an image set are associated using a parent-child relationship, and a topology diagram of the image set is obtained, as shown in FIG. 1. In FIG. 1, a line between two image layers represents the parent-child relationship, an image layer on a lower end of the line is a parent image layer of an image layer on an upper end of the line, and the image layer on the upper end of the line is a child image layer of the image layer on the lower end of the line. It can be seen from FIG. 1 that each image layer in the image set may be a parent image layer of one image layer/some image layers, and may also be a child image layer of one image layer. Each parent image layer may have multiple child image layers, and each child image layer can have only one parent image layer. Except the base image, each image layer has a parent image layer.

The parent-child relationship between image layers in the image set needs to be recorded in a manner. In some manners, each image layer includes a parent image field used to record an image layer ID of a parent image layer (which is hereinafter referred to as a parent image layer ID for ease of description) of the image layer. In this way, the topology diagram of the entire image set can be obtained according to the parent image layer IDs of all the image layers in the image set.

In the image set, the parent-child relationship between image layers may be further recorded using an image layer relationship list. Compared with recording the parent-child relationship using a parent image layer ID, recording the parent-child relationship between image layers using the image layer relationship list is simpler and more direct and helps improve query efficiency of the parent-child relationship.

In the image set, a parent-child relationship between images may be further recorded using an image relationship list. When whether all parent images of an image are in the image set needs to be queried, recording the parent-child relationship between images using the relationship list is simpler and more direct and helps improve image query efficiency.

The computing device includes hardware modules such as a processor, a memory, and a communications interface. The processor may be a central processing unit (CPU), a hardware chip, or a combination of a CPU and a hardware chip. The memory may be a volatile memory, for example, a random-access memory (RAM), a non-volatile memory, for example, a read-only memory (ROM), a flash memory, an HDD, or an SSD. The memory may further be any combination of the foregoing types of memories.

Figure 2A:
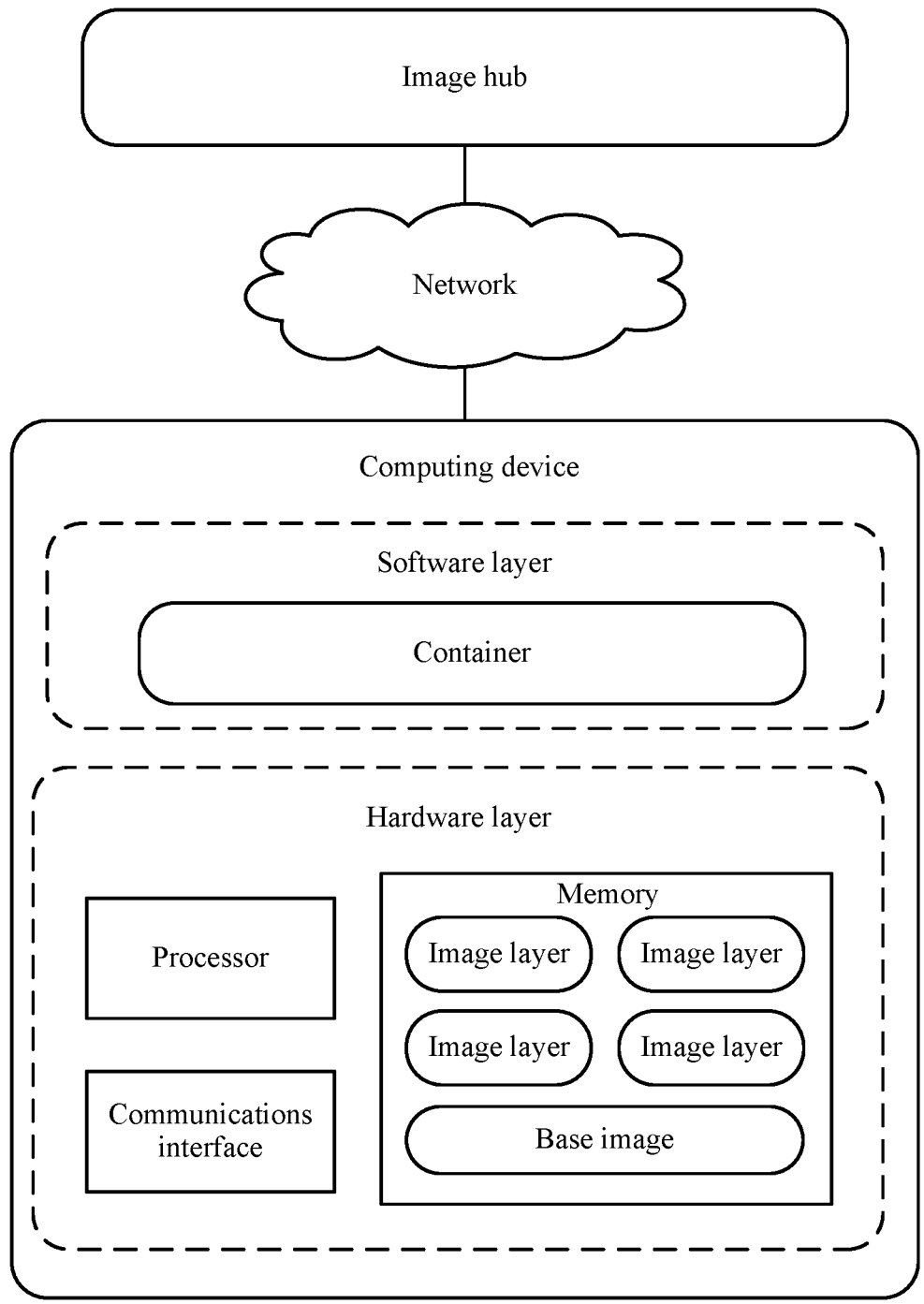
FIG. 2A is a schematic diagram of a deployment manner of an image set.

As shown in FIG. 2A, the image set may be deployed on a single computing device. The image set is stored in a local memory of each computing device, and further, may be downloaded by the computing device from a remote image hub to the local memory using a network, or may be actively established by the computing device. The processor of the computing device runs different images in the memory to support use of different types of containers.

Figure 2B:
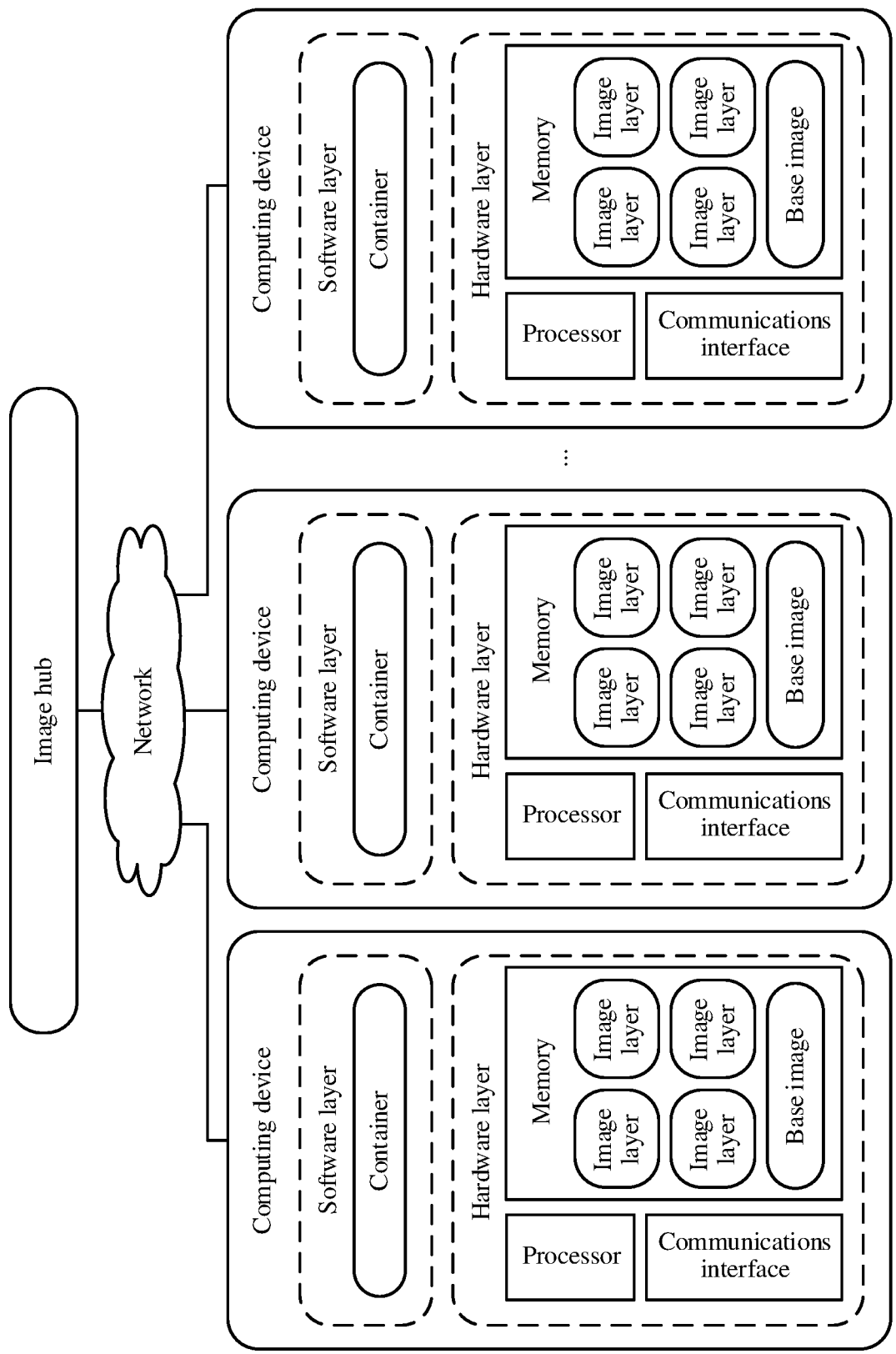
FIG. 2B is a schematic diagram of another deployment manner of an image set.

Alternatively, as shown in FIG. 2B, the image set may be deployed on a local memory of each computing device in a cluster including multiple computing devices. In FIG. 2B, each computing device independently processes a locally stored image. A processing method is basically the same as a processing method of a single computing device. For an image processing method applicable to a cluster scenario shown in FIG. 2B, refer to related description in FIG. 2A.

Figure 2C:
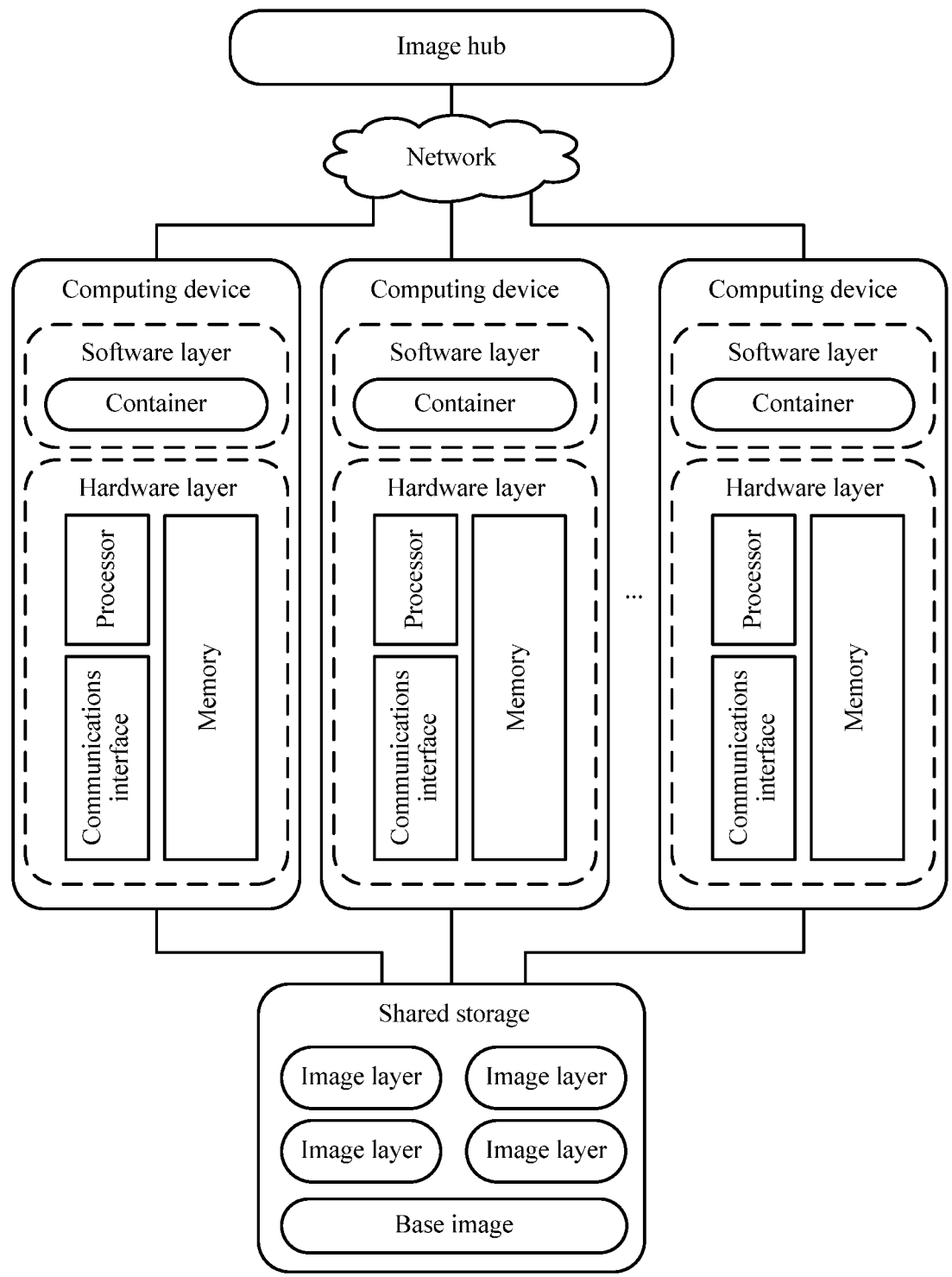
FIG. 2C is a schematic diagram of another deployment manner of an image set.

In the computing device cluster, a same image may be deployed on different computing devices such that not all containers corresponding to the image stop running because one host is faulty. As a cluster scale expands, and a quantity of images in the image set increases, same images stored in each computing device waste large storage space. For this problem, this application further provides another scenario, and a computing device cluster in the scenario further includes a shared storage. Referring to FIG. 2C, the image set is not deployed on each computing device but on the shared storage. Each computing device accesses the shared storage using the communications interface to obtain a required image to a local memory for use by a container. Using the shared storage can reduce storage space wastes caused when each computing device stores same images.

The shared storage may be a distributed filesystem, or a shared storage device of another type, for example, a storage area network (SAN). All computing devices jointly access the shared storage, that is, each computing device can perform the operations of accessing an image in the shared storage, downloading an image from an image hub to the shared storage using a network, deleting an image in the shared storage, generating a copy of an image and adding the generated image copy to the shared storage, generating a new image and adding the new image to the shared storage, and the like.

In the scenario shown in FIG. 2C, because each computing device can access the shared storage, a management node needs to be disposed in the computing cluster to perform scheduling and management on each computing device.

An image information list is deployed on each computing device in the computing cluster, and the image information list records images included in the shared storage. When the images in the shared storage change because a computing device performs an operation such as downloading an image to the shared storage, deleting an image in the shared storage, or generating a new image and adding the new image to the shared storage, the computing device updates a local image information list, and instructs the management node to update an image information list on another computing device in the cluster in order to ensure consistency among image information lists locally stored on all computing devices.

FIG. 2A to FIG. 2C describe multiple application scenarios in this application, and the following describes an image processing method provided in this application for each scenario.

Image Processing Method in a Single Computing Device Scenario

Figure 3:
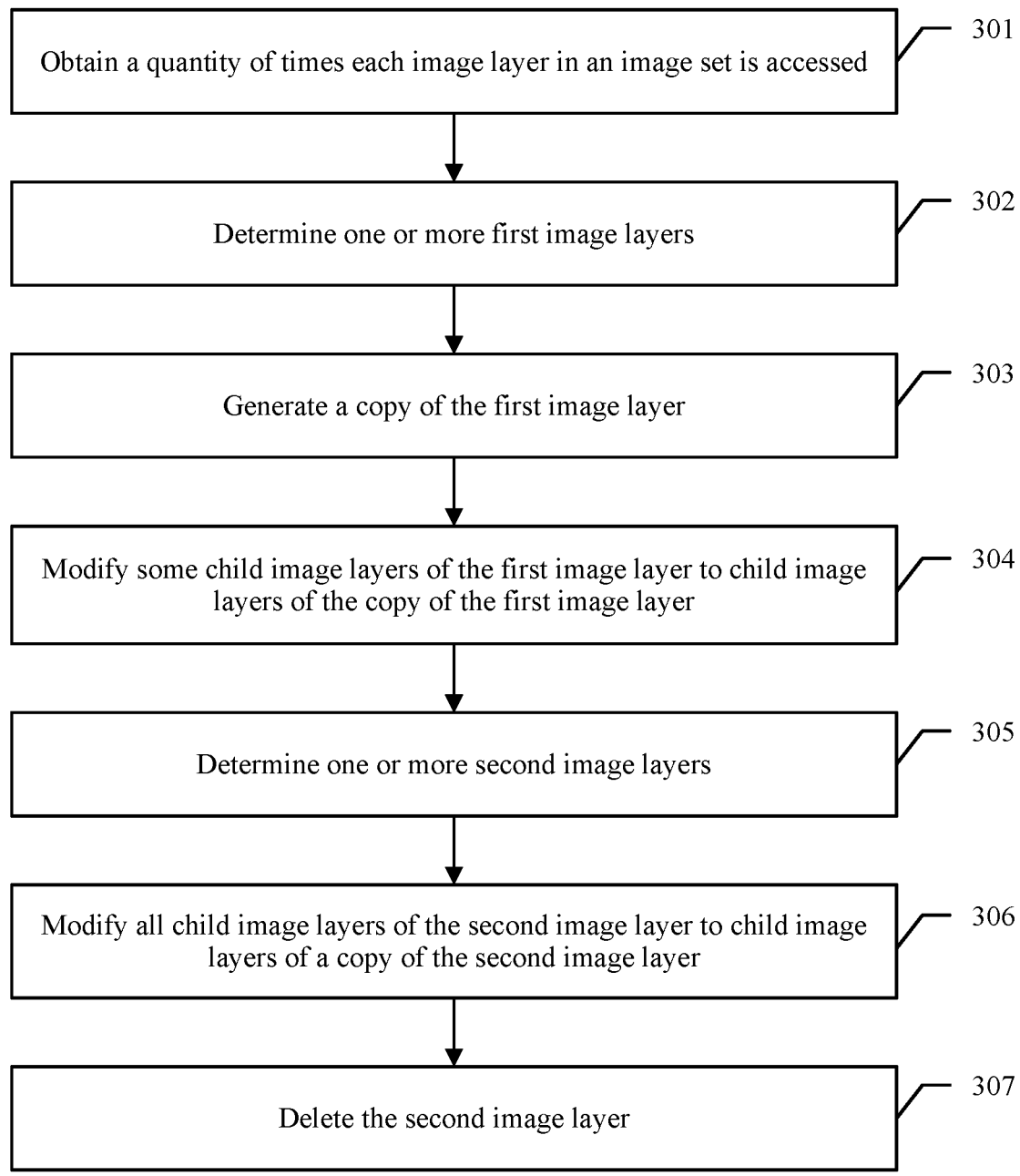
FIG. 3 is a flowchart of an embodiment of an image processing method according to this application.

The following describes an image processing method applicable to a single computing device shown in FIG. 2A. Referring to FIG. 3, the image processing method includes the following steps.

Step 301: Obtain a quantity of times each image layer in an image set is accessed.

A user may access an image in the image set using various instructions. When accessing an image, the user successively reads image layers included in the image, until a base image. The computing device obtains the quantity of times each image layer in the image set is accessed.

The computing device may obtain a quantity of times each image layer is accessed per unit time, that is, collect statistics on access frequency of each image layer. Alternatively, the computing device may collect statistics on a quantity of times each image layer is accessed in a specified period of time, for example, a recent period of time.

Step 302: Determine one or more first image layers.

The computing device determines the first image layer according to a statistical result of the quantity of times each image layer in the image set is accessed. A quantity of times the first image layer in the image set is accessed is greater than a first threshold, and the first image layer has at least two child image layers.

There may be one or more image layers in the image set that meet a condition that "a quantity of times an image layer is accessed is greater than the first threshold and the image layer includes at least two child image layers." Therefore, there may be one first image layer or at least two first image layers.

For all image layers in the image set, the first threshold may be a globally unified value. In addition, when a child image layer in the image set is accessed, all image layers inherited by the child image layer need to be accessed. Therefore, a quantity of times an image layer at a lower layer is accessed is definitely greater than a quantity of times an image layer at an upper layer is accessed. Therefore, the first threshold may be not a globally unified value, and different first thresholds may be set for different image layers. For example, a first threshold for an upper image layer is smaller, and a first threshold for a lower image layer is larger.

Step 303: Generate a copy of the first image layer.

After determining the first image layer, the computing device generates the copy of the first image layer. The computing device may copy the first image layer to obtain the copy of the first image layer, and configure a globally unique image layer ID for the copy of the first image layer.

In this step, the computing device may generate only one copy for the first image layer or may generate multiple copies for the first image layer. For example, if the quantity of times the first image layer is accessed is relatively small, one copy is generated, or if the quantity of times the first image layer is accessed is relatively large, multiple copies are generated. A quantity of copies generated by the computing device for the first image layer is not limited in this application.

It may be understood that the copy of the first image layer and the first image layer include same content. Therefore, the copy of the first image layer has a same parent image layer as the first image layer, that is, the copy of the first image layer and the first image layer have a same parent image layer ID field. In addition, if the computing device further stores an image layer relationship list that is used to record a parent-child relationship between image layers, the copy of the first image layer needs to be added to the image layer relationship list, and a parent image layer of the copy of the first image layer needs to be recorded in the image layer relationship list.

Optionally, if the first image layer has an image tag, the computing device may further allocate an image tag for the copy of the first image layer. Because the first image layer and the copy of the first image layer belong to a same version, the image tag of the copy of the first image layer needs to be the same as the image tag of the first image layer.

In this application, each image layer and a copy of the image layer are equal in status. For example, if the image set originally has an image layer m, and then a copy of the image layer m is generated, that is, an image layer k, the image layer k is considered as the copy of the image layer m, and in addition, the image layer m may also be considered as a copy of the image layer k. For ease of description, descriptions of "the first image layer" and "the copy of the first image layer" used in this application are only for distinguishing between the two image layers, and no limitation is set on status of the two image layers. Actually, "the first image layer" may also be considered as a copy of "the copy of the first image layer."

Step 304: Modify some child image layers of the first image layer to child image layers of the copy of the first image layer.

The computing device modifies some child image layers of the first image layer to the child image layers of the copy of the first image layer. Further, the computing device modifies a parent image layer ID field of the some child image layers from an image layer ID of the first image layer to an image layer ID of the copy of the first image layer such that a parent image layer of the some child image layers changes from the first image layer to the copy of the first image layer.

In addition, if the computing device further includes the image layer relationship list used to record the parent-child relationship between image layers, the computing device needs to modify a parent image layer that is of the some child image layers and recorded in the image layer relationship list from the first image layer to the copy of the first image layer.

After the parent image layer of the some child image layers changes to the copy of the first image layer, when accessing the some child image layers again, the user accesses the copy of the first image layer instead of the first image layer. In this way, some access traffic at the first image layer is offloaded to the copy of the first image layer, and access pressure of the first image layer is reduced.

Optionally, the image processing method provided in this embodiment further includes the following steps.

Step 305: Determine one or more second image layers.

The computing device determines the second image layer according to the quantity of times each image layer in the image set is accessed. A quantity of times the second image layer in the image set is accessed is less than a second threshold, and the second image layer has a copy.

There may be one or more image layers in the image set that meet a condition that "a quantity of times an image layer is accessed is less than the second threshold and the image layer has a copy." Therefore, there may be one second image layer or at least two second image layers.

For the image set, the second threshold may be a globally unified value or may be not a globally unified value. For example, the computing device may configure a smaller second threshold for an upper image layer and a larger second threshold for a lower image layer.

In addition, because the first threshold is used to select the first image layer with larger access pressure, and the second threshold is used to select the second image layer with smaller access pressure, the second threshold needs to be less than the first threshold.

Optionally, an image layer and a copy of the image layer need to have a same image tag. Therefore, the computing device may determine, by identifying a same image tag, an image layer that has a copy. The computing device may also determine, in another manner, an image layer that has a copy, and this is not limited in this embodiment.

In step 301, the computing device collects statistics on the quantity of times each image layer in the image set is accessed. In this step, the computing device may directly use the quantity of times each image layer is accessed that is obtained by the computing device by means of statistics collection in step 301. In this case, there is no specific sequence between step 305 and steps 302 to 304, provided that step 305 is after step 301.

Certainly, in step 305, the computing device may also perform an operation of collecting statistics on the quantity of times each image layer is accessed. In this way, there is no specific sequence between step 305 and steps 301 to 304. If step 305 is after step 304, the second image layer determined in step 305 may include one or more first image layers or copies of the first image layer.

Step 306: Modify all child image layers of the second image layer to child image layers of a copy of the second image layer.

The computing device modifies all the child image layers of the second image layer to the child image layers of the copy of the second image layer. Further, the computing device modifies a parent image layer ID field of all the child image layers of the second image layer from an image layer ID of the second image layer to an image layer ID of the copy of the second image layer such that a parent image layer of the child image layers of the second image layer changes to the copy of the second image layer.

In addition, if the computing device further includes the image layer relationship list used to record the parent-child relationship between image layers, the computing device needs to modify a parent image layer that is of these child image layers and recorded in the image layer relationship list from the second image layer to the copy of the second image layer.

In addition, if the second image layer has multiple copies, the computing device may modify the child image layers of the second image layer to child image layers of one copy of the multiple copies, or to child image layers of at least two copies of the multiple copies. For example, the computing device may evenly modify the child image layers of the second image layer to child image layers of all copies, or the computing device may modify most of the child image layers of the second image layer to child image layers of a copy with small access pressure, and modify a fraction of the child image layers of the second image layer to child image layers of a copy with large access pressure.

Step 307: Delete the second image layer.

The quantity of times the second image layer is accessed is less than the second threshold, and it indicates that access pressure of the second image layer is small. After modifying all the child image layers of the second image layer to the child image layers of the copy of the second image layer, the computing device deletes the second image layer.

In addition, if the computing device further includes the image layer relationship list, the computing device needs to delete a related record of the second image layer in the image layer relationship list.

There is no specific sequence between steps 306 and 307 and steps 301 to 304, provided that steps 306 and 307 are after step 305.

In steps 305 to 307, the computing device deletes an image layer with small access pressure. In this way, a quantity of image layers in the image set is reduced, a topology structure of the image set is simplified, and storage resources are saved.

Image Processing Method in a Cluster Scenario

FIG. 2B shows an application scenario in which an image set is deployed on a computing device cluster. In the computing device cluster, each computing device processes a locally stored image set, and for the processing method, refer to the image processing method shown in FIG. 2A.

Image processing method in a scenario of a cluster+a shared storage.

Figure 4:
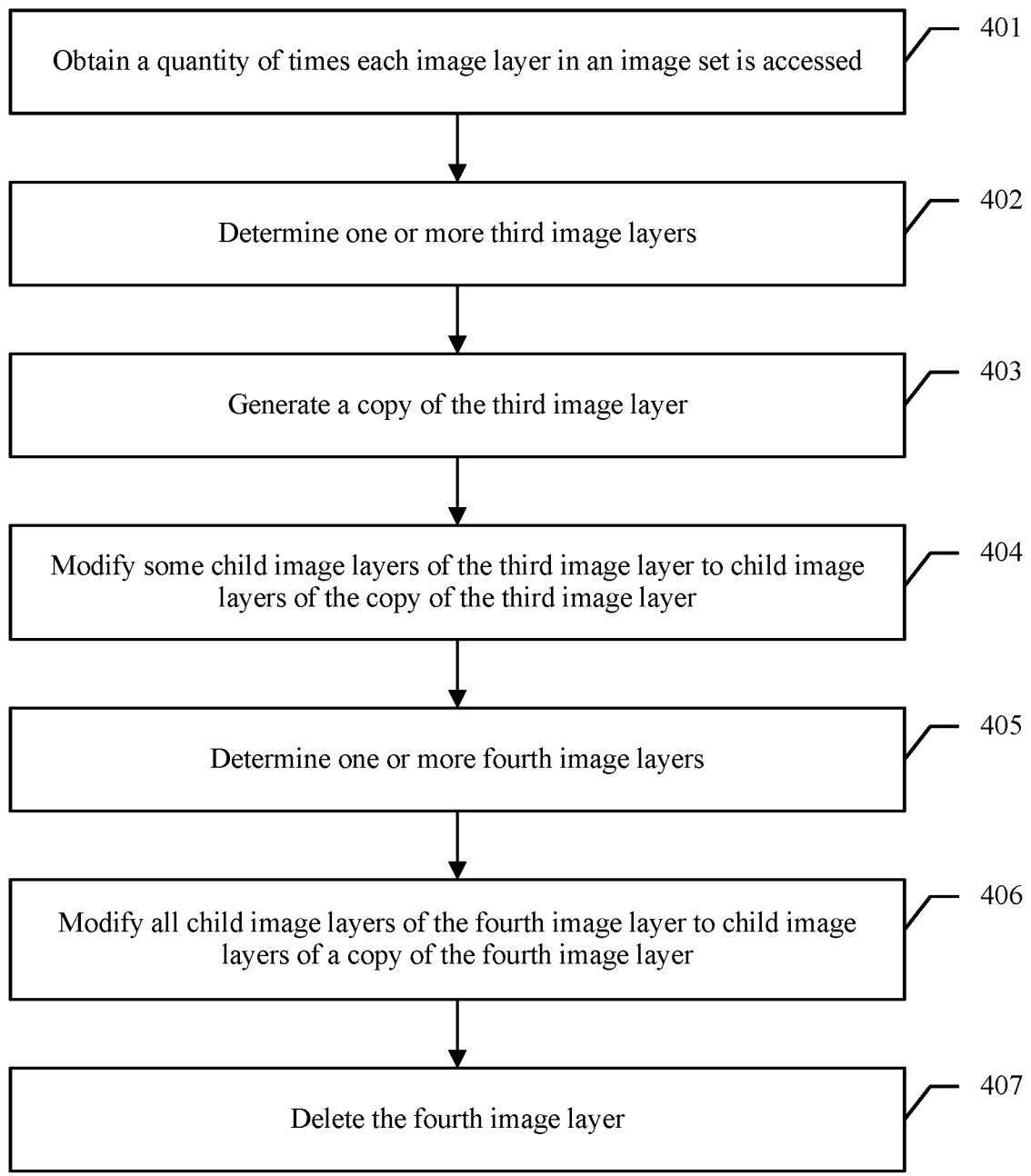
FIG. 4 is a flowchart of another embodiment of an image processing method according to this application.

Referring to FIG. 4, the following describes an image processing method in a shared storage scenario shown in FIG. 2C. The method provided in this embodiment is applicable to a management node in a computing device cluster, and the management node may be an entity physical device, for example, a server. Alternatively, the management node may be a virtual machine running on a computing device.

Step 401: Obtain a quantity of times each image layer in an image set is accessed.

The management node obtains the quantity of times each image layer in the image set deployed on a shared storage is accessed. Further, the management node may directly obtain the quantity of times each image layer in the shared storage is accessed. Alternatively, each computing device in the cluster may separately record a quantity of times the computing device accesses each image layer in the image set, and reports the quantity of times to the management node, and the management node collects statistics on the quantity of times each node accesses each image layer in the image set to obtain the quantity of times each image layer in the image set is accessed.

The management node may collect statistics on a quantity of times each image layer is accessed per unit time, that is, collect statistics on access frequency of each image layer. Alternatively, the management node may collect statistics on a quantity of times each image layer is accessed in a specified period of time, for example, a recent period of time.

Step 402: Determine one or more third image layers. A quantity of times the third image layer in the image set is accessed is greater than a third threshold, and the third image layer has at least two child image layers.

Step 403: Generate a copy of the third image layer.

Step 404: Modify some child image layers of the third image layer to child image layers of the copy of the third image layer.

Steps 402 to 404 are basically the same as steps 302 to 304, and an only difference lies in a deployment manner of the image set. Therefore, for steps 402 to 404, refer to related descriptions in steps 302 to 304, and details are not described herein.

In addition, after the management node generates the copy of the third image layer in step 403, the management node may further send information about the copy of the third image layer to an image layer relationship list stored on each computing device.

After the management node modifies the some child image layers of the third image layer to the child image layers of the copy of the third image layer, when accessing the some child image layers again, a user accesses the copy of the third image layer instead of the third image layer. In this way, some access traffic at the third image layer is offloaded to the copy of the third image layer, and access pressure of the third image layer is reduced.

Optionally, the image processing method provided in this embodiment further includes the following steps.

Step 405: Determine one or more fourth image layers. A quantity of times the fourth image layer in the image set is accessed is less than a fourth threshold, and the fourth image layer has a copy.

Step 406: Modify all child image layers of the fourth image layer to child image layers of the copy of the fourth image layer.

Step 407: Delete the fourth image layer.

Steps 405 to 407 are basically the same as steps 305 to 307, and an only difference lies in a deployment manner of the image set. Therefore, for steps 405 to 407, refer to related descriptions in steps 305 to 307, and details are not described herein.

In addition, after the management node deletes the fourth image layer in step 407, the management node further needs to delete related information of the fourth image layer in the image layer relationship list stored on each computing device.

In steps 405 to 407, the management node deletes an image layer with small access pressure. In this way, a quantity of image layers in the image set is reduced, a topology structure of the image set is simplified, and storage resources in the shared storage are saved.

Figure 5:
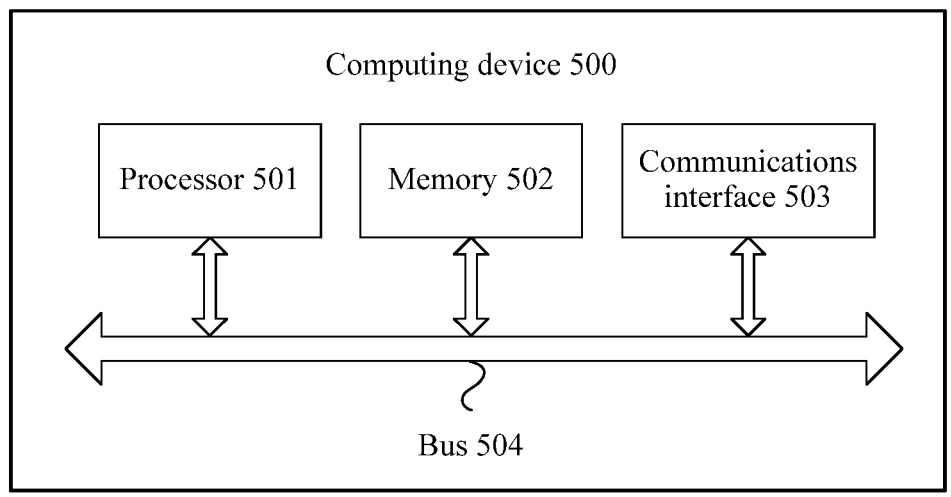
FIG. 5 is a structural diagram of an embodiment of a computing device according to this application.

The foregoing embodiments describe the image processing method provided in this application. Referring to FIG. 5, the following describes a computing device 500 configured to implement the image processing method. The computing device 500 provided in this application includes a processor 501, a memory 502, and a communications interface 503. Optionally, the computing device 500 further includes a bus 504. The processor 501, the memory 502, and the communications interface 503 may implement mutual communication connection using the bus 504. Certainly, communication may be implemented by another means such as wireless transmission.

When the technical solution provided in this application is implemented by software, program code for implementing the image processing method provided in FIG. 3 or FIG. 4 in this application may be stored in the memory 502, and executed by the processor 501.

The communications interface 503 may be a wired interface such as a fiber distributed data interface (FDDI) or an Ethernet interface. Alternatively, the communications interface 503 may be a wireless interface such as a wireless local area network interface.

By invoking the program code in the memory 502, the processor 501 is configured to perform the image processing method shown in FIG. 3 or FIG. 4.

In the scenario shown in FIG. 2A or FIG. 2B, by invoking the program code in the memory 502, the processor 501 is configured to perform the image processing method corresponding to FIG. 3.

In the scenario shown in FIG. 2C, the computing device 500 is a management node (the management node is an entity physical device) or a physical device on which a management node runs (the management node is a virtual machine running on the physical device). By invoking the program code in the memory 502, the processor 501 is configured to perform the image processing method corresponding to FIG. 4.

It may be clearly understood by a person skilled in the art that, for the purpose of convenient and brief description, for a detailed working process of the foregoing system, module, and unit, refer to a corresponding process in the foregoing method embodiments, and details are not described herein again.

In the several embodiments provided in this application, it should be understood that the disclosed system and method may be implemented in other manners. For example, the described system embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented using some interfaces. The indirect couplings or communication connections between the modules or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual requirements to achieve the objectives of the solutions of the embodiments.

In addition, functional units in the embodiments of the present disclosure may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of the present disclosure essentially, or the part contributing to other approaches, or all or some of the technical solutions may be implemented in the form of a software product. The computer software product is stored in a storage medium and includes several instructions for instructing a computer device (which may be a personal computer, a server, or a network device) to perform all or some of the steps of the methods described in the embodiments of the present disclosure. The foregoing storage medium includes any medium that can store program code, such as a universal serial bus (USB) flash drive, a removable hard disk, a ROM, a RAM, an SSD, a magnetic disk, or an optical disc.

What is claimed is:

1. An image processing method, implemented by a computing device, comprising:
    obtaining a quantity of times each image layer in an image set is accessed, wherein the image set comprises a base image and a plurality of images obtained by superimposing one or more image layers on the base image, wherein each image layer comprises incremental data for modifying the base image, wherein the images of the image set are accessed by accessing the one or more image layers and the base image and wherein each image layer is accessed by reading the incremental data of each image layer;
    determining a first image layer by comparing the quantity of times that image layers in the image set is accessed with a first threshold, wherein a quantity of times that the first image layer is accessed is greater than the first threshold, wherein the first image layer and a plurality of image layers are associated using a parent-child relationship, and wherein the first image layer comprises a plurality of child image layers;
    generating a copy of the first image layer; and
    changing one or more child image layers of the first image layer to child image layers of the copy of the first image layer.

2. The image processing method of claim 1, wherein an image layer identity (ID) of the first image layer is a parent image layer ID of the one or more child image layers, and wherein generating the copy of the first image layer comprises:
    copying the first image layer to obtain the copy of the first image layer; and
    configuring an image layer ID for the copy of the first image layer,
    wherein changing the one or more child image layers comprises modifying the parent image layer ID of the one or more child image layers to the image layer ID of the copy of the first image layer.

3. The image processing method of claim 1, further comprising:
    determining a second image layer is accessed a quantity of times less than a second threshold, wherein the image set further comprises a copy of the second image layer and a child image layer of the second image layer;
    modifying the child image layer of the second image layer to a child image layer of the copy of the second image layer; and
    deleting the second image layer.

4. The image processing method of claim 1, wherein the image set is deployed on the computing device, and wherein obtaining a quantity of times each image layer in the image set is accessed comprises collecting statistics on access frequency of each image layer.

5. The image processing method of claim 1, wherein the computing device is part of a computing device cluster comprising a shared storage for deploying the image set and a plurality of computing devices for accessing the image set.

6. The image processing method of claim 5, wherein obtaining the quantity of times each image layer in the image set is accessed comprises:
    obtaining access information from each computing device in the computing device cluster, wherein each access information comprises a quantity of times a computing device in the computing device cluster accesses each image layer in the image set; and
    collecting statistics on the access information from each computing device in the computing device cluster to obtain the quantity of times each image layer in the image set is accessed.

7. A computing device, comprising:
    a processor;
    a communications interface coupled to the processor; and
    a memory coupled to the processor and configured to store program code which, when executed by the processor, causes the processor to:
        obtain a quantity of times each image layer in an image set is accessed, wherein the image set comprises a base image and images obtained by superimposing one or more image layers on the base image, wherein each image layer includes incremental data for modifying the base image, wherein the images of the image set are accessed by accessing one or more image layers and the base image, and wherein each image layer is accessed by reading the incremental data of each image layer;

determine a first image layer by comparing the quantity of times that image layers in the image set is accessed with a first threshold, wherein a quantity of times that the first image layer is accessed is greater than the first threshold, wherein the first image layer and a plurality of image layers are associated using a parent-child relationship, and wherein the first image layer comprises a plurality of child image layers;

generate a copy of the first image layer; and change child image layers of the first image layer to child image layers of the copy of the first image layer.

8. The computing device of claim 7, wherein an image layer identity (ID) of the first image layer is a parent image layer ID of the one or more child image layers, and wherein the program code further causes the processor to:

copy the first image layer to obtain the copy of the first image layer;

configure an image layer ID for the copy of the first image layer; and modify the parent image layer ID of the one or more child image layers to the image layer ID of the copy of the first image layer.

9. The computing device of claim 7, wherein the program code further causes the processor to:

determine a second image layer is accessed a quantity of times less than a second threshold, wherein the image set further comprises a copy of the second image layer and a child image layer of the second image layer;

modify the child image layer of the second image layer to a child image layer of the copy of the second image layer; and delete the second image layer.

10. The computing device of claim 7, wherein the image set is deployed on the computing device, and wherein the program code further causes the processor to collect statistics on access frequency of each image layer.

11. The computing device of claim 7, wherein the computing device is part of a computing device cluster comprising a shared storage for deploying the image set and a plurality of computing devices for accessing the image set.

12. The computing device of claim 11, wherein the program code further causes the processor to:

obtain access information from each computing device in the computing device cluster, wherein each access information comprises a quantity of times a computing device in the computing device cluster accesses each image layer in the image set; and collect statistics on the access information from each computing device in the computing device cluster to obtain the quantity of times each image layer in the image set is accessed.

13. A non-transitory computer readable storage medium comprising instructions which, when executed by a processor of a computing device, cause the computing device to:

obtain a quantity of times each image layer in an image set is accessed, wherein the image set comprises a base image and images obtained by superimposing one or more image layers on the base image, wherein each image layer includes incremental data for modifying the base image, wherein the images of the image set are accessed by accessing one or more image layers and the base image, and wherein each image layer is accessed by reading the incremental data of each image layer;

determine a first image layer by comparing the quantity of times that image layers in the image set is accessed with a first threshold, wherein a quantity of times that the first image layer is accessed is greater than the first threshold, wherein the first image layer and a plurality of image layers are associated using a parent-child relationship, and wherein the first image layer comprises a plurality of child image layers;

generate a copy of the first image layer; and change child image layers of the first image layer to child image layers of the copy of the first image layer.

14. The non-transitory computer readable storage medium of claim 13, wherein an image layer identity (ID) of the first image layer is a parent image layer ID of the one or more child image layers, and wherein the instructions further cause the computing device to:

copy the first image layer to obtain the copy of the first image layer;

configure an image layer ID for the copy of the first image layer; and modify the parent image layer ID of the one or more child image layers to the image layer ID of the copy of the first image layer.

15. The non-transitory computer readable storage medium of claim 13, wherein the instructions further cause the computing device to:

determine a second image layer is accessed a quantity of times less than a second threshold, wherein the image set further comprises a copy of the second image layer and a child image layer of the second image layer;

modify the child image layer of the second image layer to a child image layer of the copy of the second image layer; and delete the second image layer.

16. The non-transitory computer readable storage medium of claim 13, wherein the image set is deployed on the computing device, and wherein the instructions further cause the computing device to collect statistics on access frequency of each image layer.

17. The non-transitory computer readable storage medium of claim 13, wherein the computing device is part of a computing device cluster comprising a shared storage for deploying the image set and a plurality of computing devices for accessing the image set.

18. The non-transitory computer readable storage medium of claim 17, wherein the instructions further cause the computing device to:

obtain access information from each computing device in the computing device cluster, wherein each access information comprises a quantity of times a computing device in the computing device cluster accesses each image layer in the image set; and collect statistics on the access information from each computing device in the computing device cluster to obtain the quantity of times each image layer in the image set is accessed.

* * * * *

UNITED STATES PATENT AND TRADEMARK OFFICE
CERTIFICATE OF CORRECTION

PATENT NO. : 11,080,909 B2
APPLICATION NO. : 16/030442
DATED : August 3, 2021
INVENTOR(S) : Jinhui Cao, Zhe Wang and Jincheng Li It is certified that error appears in the above-identified patent and that said Letters Patent is hereby corrected as shown below:

On the Title Page

Item [56], delete "CN 10316108 A 6/2013" and insert --CN 103136108 A 6/2013--

Signed and Sealed this
Twenty-first Day of September, 2021

Drew Hirshfeld
*Performing the Functions and Duties of the*
*Under Secretary of Commerce for Intellectual Property and*
*Director of the United States Patent and Trademark Office*